United States Patent
Concialdi

(10) Patent No.: US 6,394,128 B1
(45) Date of Patent: May 28, 2002

(54) INTAKE TRACT NEGATIVE PRESSURE RELIEF VALVE FOR I.C. ENGINE

(75) Inventor: John P. Concialdi, Redondo Beach, CA (US)

(73) Assignee: Advanced Engine Management, Inc., Hawthorne, CA (US)

( * ) Notice: Subject to any disclaimer, the term of this patent is extended or adjusted under 35 U.S.C. 154(b) by 0 days.

(21) Appl. No.: 09/691,159

(22) Filed: Oct. 19, 2000

(51) Int. Cl.[7] ............................................. F16K 31/126
(52) U.S. Cl. ..................... 137/550; 137/526; 137/907; 137/859; 123/188.1
(58) Field of Search ................... 137/526, 907, 137/859, 550; 251/331; 123/188.4, 188.1

(56) References Cited

U.S. PATENT DOCUMENTS

| 1,853,496 A | 4/1932 | Blair |
| 3,077,715 A | 2/1963 | Carroll |
| 4,273,564 A | 6/1981 | Sugie et al. |
| 4,969,939 A | 11/1990 | Machado |
| 4,974,632 A | * 12/1990 | Ericson ...................... 137/526 |
| 5,033,504 A | 7/1991 | Kallenbach |
| 5,117,860 A | * 6/1992 | Horner, Jr. .............. 137/526 X |
| 5,285,547 A | 2/1994 | Sebor |
| 5,363,877 A | 11/1994 | Frentzel et al. |
| 5,363,878 A | 11/1994 | Atkins |
| 5,400,753 A | 3/1995 | Andress et al. |
| 5,682,624 A | * 11/1997 | Ciochetti ................ 137/526 X |
| 5,996,563 A | * 12/1999 | Liao ....................... 137/526 X |

* cited by examiner

*Primary Examiner*—Kevin Lee
(74) *Attorney, Agent, or Firm*—Liniak, Berenato, Longacre & White

(57) ABSTRACT

A pressure relief valve is disclosed for use in air intake tracts of I.C. engine installations. The air valve includes a tubular member having apertures therein covered over by resilient diaphragm elements that, when a negative pressure (vacuum) within the system exceeds a pre-determined level, deflect and enable relief of the negative pressure within the air intake. When the negative pressure returns to normal operating levels, the diaphragm returns to position. The negative pressure within the intake tract can be raised, for example, by an obstruction at the air inlet of the tract.

20 Claims, 4 Drawing Sheets

INTAKE TRACT NEGATIVE PRESSURE RELIEF VALVE FOR I.C. ENGINE

BACKGROUND OF THE INVENTION

The present invention relates to a negative pressure relief valve for use in the intake tract of an I.C. engine. More specifically, the invention is a valve adapted for use in an I.C. engine intake tract that uses a pressure relief structure activated in response to excessive negative pressure (vacuum) within the intake tract.

In the field of I.C. engines adapted for use in various applications, the air source for the engine is often displaced from the intake plenum of the engine. In an automobile, for example, the air intake source is often placed in an area remote from the intake plenum. The locations used by various automobile manufacturers have included shrouds behind headlamps, air scoops located on external surfaces of the vehicle, inner fender-well shrouds, and hot air intake shrouds positioned near, and heated by, exhaust gas manifolds. In applications of I.C. engine use in generators, air compressors, and pumps, the air intake is often located near an external surface of the surrounding cover of the machine. In truck, agricultural, military, and other overland (off-road) applications of I.C. engine use, the air intake can be extremely remote from the intake plenum of the engine. An example of extreme remoteness is in a military vehicle adapted for crossing bodies of water in a partially submerged condition. In such instances, the intake tract can be several feet in length and extend to the roofline of the vehicle.

The design objective of any air intake for I.C. engine use is to create a reasonably reliable source of uncontaminated air for consumption by the engine during normal operation. Virtually all intake systems additionally include a filtering system for the air that can be an oil bath type, paper filter, treated filament filter, foam, mesh type, etc., positioned between the air intake and the actual intake plenum of the engine.

In any of the foregoing intake systems, the possibility occurs where the outside air intake of the intake tract can become fouled with water or other obstruction. If the water or other obstruction is passed through the intake tract to the intake plenum and ultimately into the I.C. engine, severe operational impairment or total failure of the I.C. engine can result. This possibility can occur, for example, where an I.C. engine is used in an automotive application and the automobile is used to pass through deeper water than anticipated by the manufacturer of the vehicle. The air intake may be overtaken by a wave of water created by the vehicle movement and water passed into the intake tract and into the engine resulting in failure. In another example, an I.C. engine equipped pump, generator, or compressor may be used in a location that causes the air intake to become submerged, even momentarily, resulting in failure of the engine.

SUMMARY OF THE INVENTION

The present invention is directed to solving the problem of water, or other obstruction, unintentionally infiltrating the intake tract of an I.C. engine. The invention is a negative pressure relief valve positioned along the intake tract of an I.C. engine. When the intake tract experiences a sufficient pressure differential between ambient pressure and the negative pressure developing within the intake tract, the valve opens and allows air to pass directly into the intake tract from a second source. The second source of air can be the air located within the surrounding engine cover associated with the I.C. engine, or may be air from a second source also remote from the immediate proximity of the I.C. engine.

In one embodiment of the invention, the valve is adapted to substantially surround the intake bore of the intake tract. The valve includes a multi-ported or vented structure that rings the intake tract and is valved by a proximate resilient multi-diaphragmed structure mated thereto in correspondence to the multiple ports. The resilience of the diaphragm is selected according to a predetermined pressure differential level for activation of the valve. For example, a large displacement I.C. engine truck or military application of the valve would require a relatively high resilience for the diaphragm whereas a smaller displacement motorcycle or pump I.C. engine would use a diaphragm of a relatively lower resilience. To supplement the natural resilience of the diaphragm, a foam spring, for example, can also be positioned to support the diaphragm.

These and other features of the invention will become apparent from the following detailed description, claims, and drawings herewith. The various features may be implemented in whole or part without departing from the spirit and scope of the invention. The valve, for example, may be used in any negative pressure (vacuum) air tract where a certain threshold of negative pressure is not to be exceeded. Examples would include any air tract where collapse of the tract, over-heating of the vacuum source (i.e., pump), or other potential failure might result owing to excessive negative pressure occurring as a result of blockage of the tract.

DETAILED DESCRIPTION OF THE PREFERRED EMBODIMENT

Figure 1:
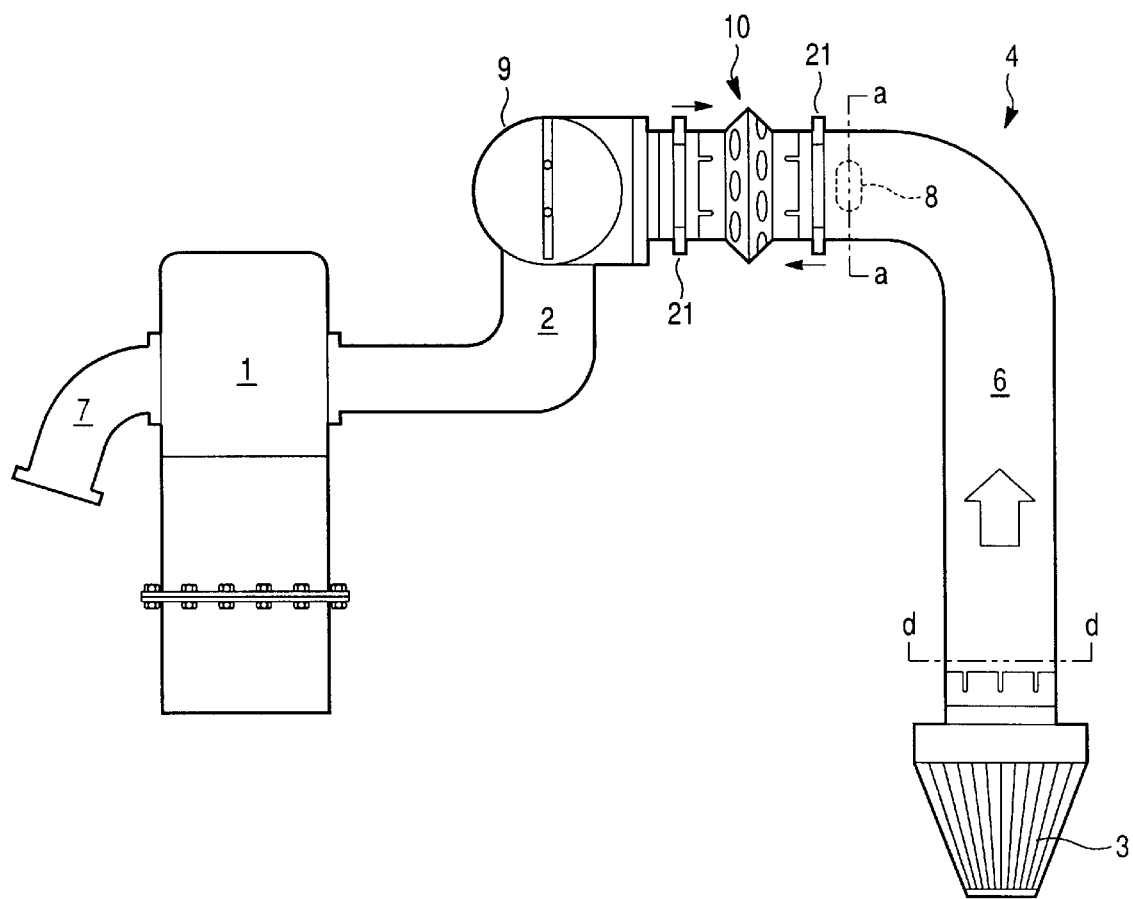
FIG. 1 is a schematic view of an intake tract of an I.C. engine incorporating a pressure relief valve according to the present invention.

A relief valve 10 according to the present invention is shown in position in the intake tract of an I.C. engine 1 in FIG. 1. This schematic shows the typical parts of an intake tract of an I.C. engine 1. The engine 1 is connected to an intake plenum 2 that conducts air from the air box or filter 3 through the throttle body 9 and into the engine 1. Once the combustion cycle is completed, air is exhausted out of the engine through the exhaust manifold 7. The intake tract of the engine 1 also includes, for example, an air intake passageway 4 that conducts incoming air from a source remote from the I.C. engine 1. This source can be an external scoop on the vehicle or engine shroud, or can simply be a source of relatively cooler air within the vicinity of the engine, i.e., lower in the engine compartment. This air can be sourced from an air intake tube 6 that extends to and is open at the desired location for air to feed the engine. Occasionally, the air intake also has a heat activated hot air intake system (not shown) located proximate the exhaust manifold exterior so that incoming air is warmed by the exhaust. This warmed air system is usually disabled once a predetermined operating temperature of the engine is reached.

An intake pressure relief valve 10 is shown in position along the intake tract 6. The only requirement for positioning of the valve 10 is that it should be at the highest possible position in the inlet duct, upstream in the intake tract from throttle body 9, and physically above the level d entrance to the induction tube of the intake tract.

Figure 2:
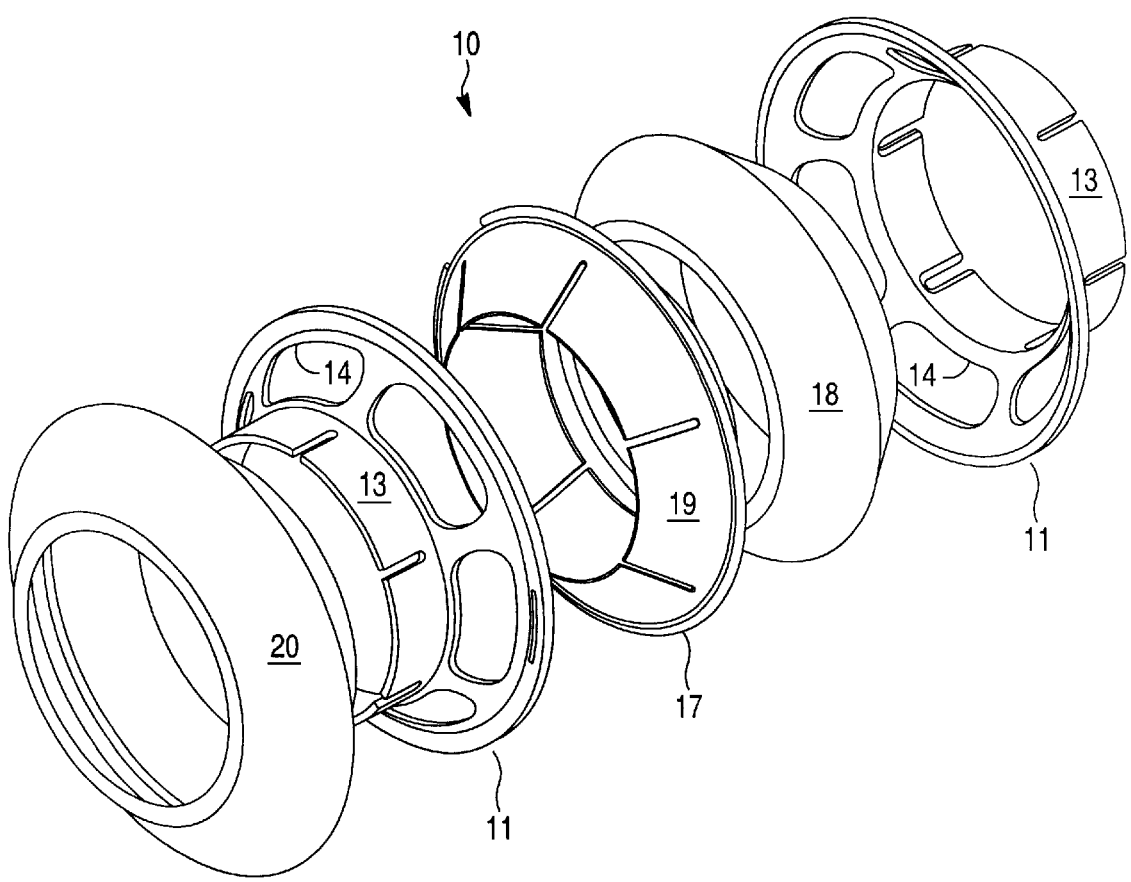
FIG. 2 is an exploded perspective view of a pressure relief valve according to the present invention.
Figure 3:
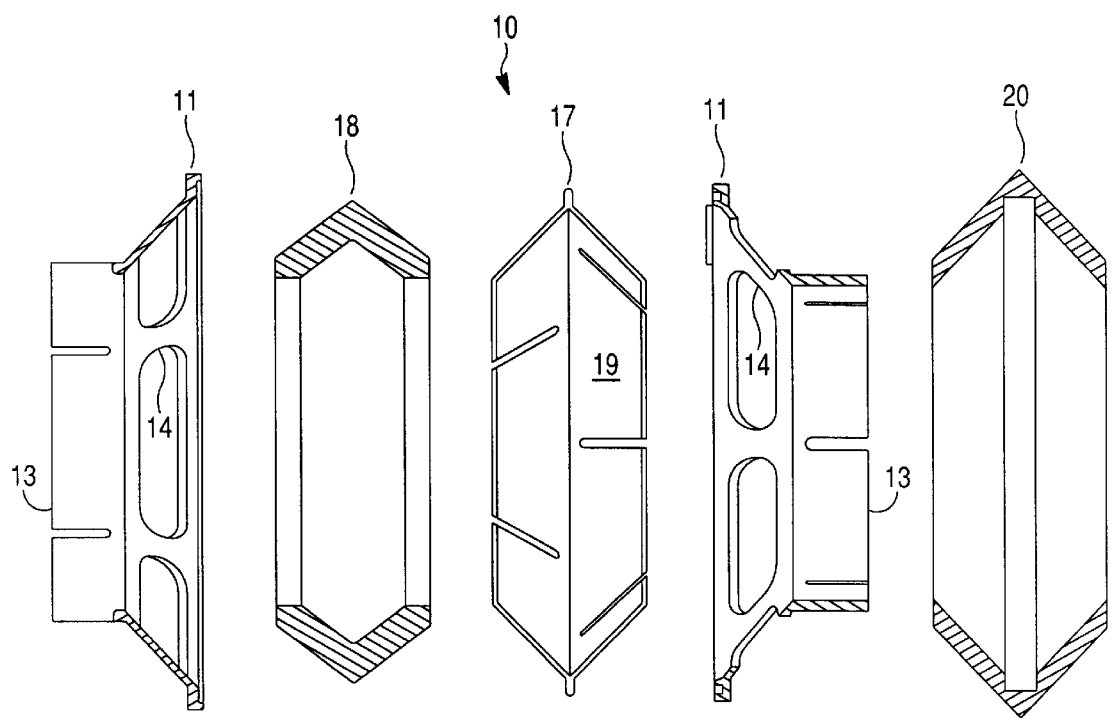
FIG. 3 is an exploded plan view of a pressure relief valve according to the present invention; and, FIG. 4 is an exploded perspective view of an alternative embodiment of a pressure relief valve according to the present invention.

FIGS. 2 and 3 show an exploded view of a preferred embodiment of a valve 10 according to the present invention. This embodiment shows a first tubular element 11 which mates to second similarly configured tubular element 11. These respective elements 11 are attached one to the other by a suitable method, for example, sonic or chemical welding. Alternatively an additional surrounding resilient collar (not shown) could surround the mating periphery of the respective collars and hold them in respective position.

Prior to assembly of the respective tubular elements 11 into a larger tubular valve 10, a resilient member 17 is placed inside. This resilient member 17 is formed to have diaphragms 19 which align with and match respective aperture(s) 14 in the tubular collar elements 11. The diaphragm 19 associated with each aperture 14 controls the flow of air through the aperture. In this embodiment of the valve, a supplementary foam spring element 18 is shown which bolsters the natural resilience of the individual diaphragm(s) 19 associated with the resilient member 17.

The air intake valve can be positioned along the intake tract 4, 6 of an I.C. engine 1 by cutting the tract and removing a section thereof and replacing the removed section with the air valve 10. Alternatively, and preferably, the air valve 10 is simply slid over the intake tube 6 or intake air passageway 4 to align with a pre-positioned hole or aperture 8 in the sidewall of the tube 6 (shown at level a) or in the sidewall of the passageway 4 (shown at level c). In either installation, the air valve 10 is clamped in position with clamps 21 positioned so as to clamp and seal the attaching collar portions 13 of the valve 10 to the exterior of the air intake tract tubular element 4, 6.

Once installed, the intake valve 10 provides negative pressure relief for the air tract 4, 6 of the I.C. engine 1. If the air intake inlet 6 becomes fouled by water or other obstruction, the negative pressure (vacuum) quickly builds within the tract 4, 6, and is relieved by the movement of diaphragm member 19 of resilient member 17 away from its blocking position of respective apertures 14. Once the diaphragm is moved, it will return to position by its own resilience once the obstruction is cleared from inlet 6.

Figure 4:
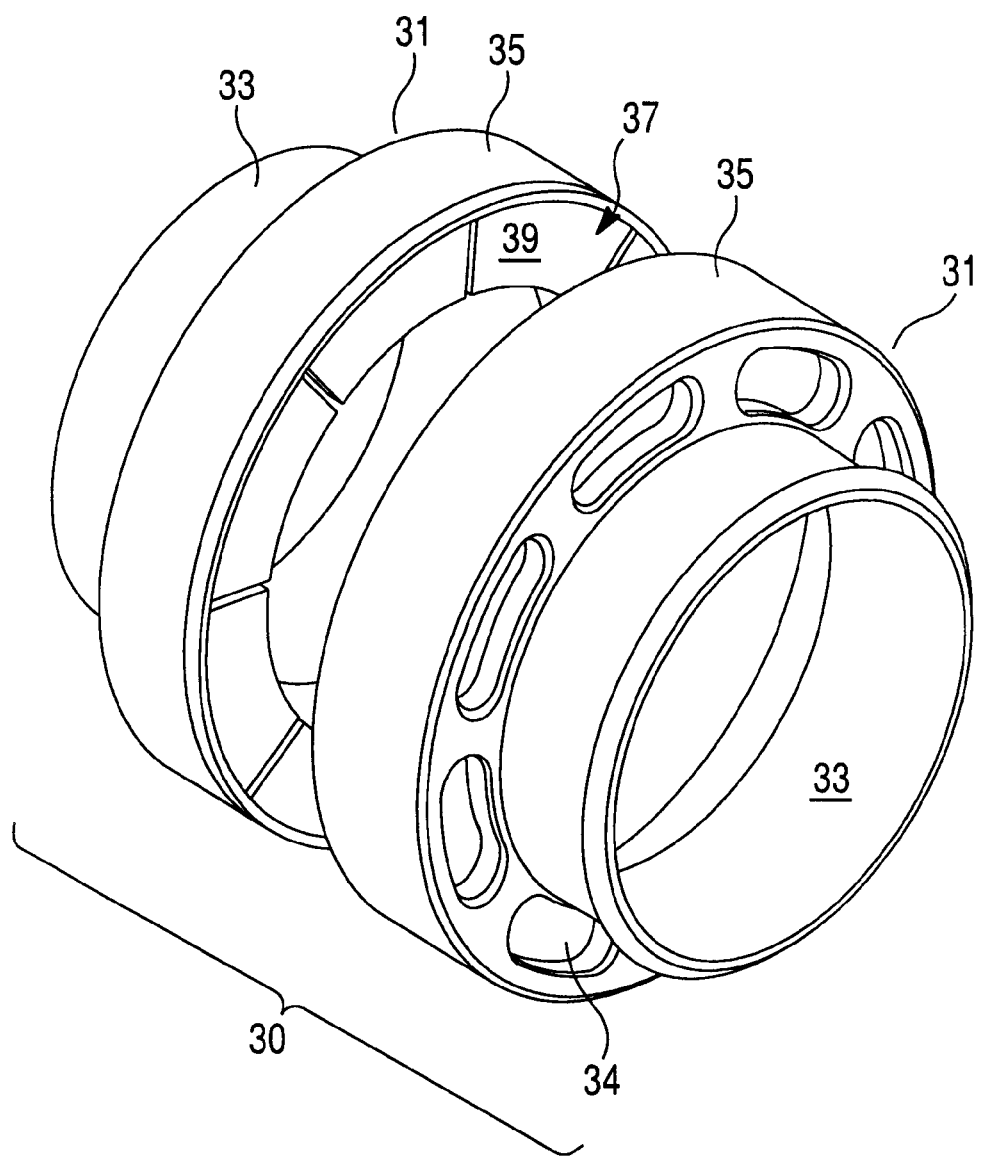

The air intake valve can take on a variety of tubular shapes which match, or reasonably approximate, the size of the respective intake tract elements 4, 6 for a selected installation. A second embodiment of the valve 10 is shown, for example, in FIG. 4, as valve 30. The respective elements of the air intake 30 are numbered similarly to the elements of the valve 10 shown in FIGS. 2 and 3. The valve 30 is made of two tubular elements 31 joined to surround a resilient member 37 having diaphragm elements 39 thereon. The diaphragm elements match a corresponding aperture 34 in the respective tubular elements 31 and control airflow therethrough when a negative pressure is detected within the valve when it is mounted to an air tract. This embodiment may also include an internal foam supplement to bolster the resiliency of the diaphragm 39.

The air valve 10 can be made from any suitable material (plastic, metal, rubber, etc.) which has sufficient dimensional stability in the expected operating environment of the air intake tract. In addition, the valve 10 may be supplemented by an outer filter element 20 (shown in FIGS. 2 & 3) for filtration of the air passing through apertures 14 when the by-pass valve 10 is activated by negative pressure within an associated intake tract.

If the air valve 10 were positioned underhood in a vehicle installation, the selected material would have to survive the high temperature and harsh vibrational environment for thousands of hours. In another example, the valve may be positioned exterior to a vacuum source that is otherwise shrouded for protection, and the air valve would have to operate in an exposed environment including long term UV exposure or other corrosive environmental aspects.

The foregoing invention has been described with respect to certain preferred embodiments. These descriptions should not be considered limiting to the invention and the various improvements and applications that would occur to a person of ordinary skill in the relevant field.

What is claimed is:

1. A relief valve adapted for connecting along a tubular air tract between an air intake connected to said tract and a source of vacuum also connected to said tract, said relief valve comprising:

a first tubular member having walls defining a passageway therein, said walls including at least one aperture therein covered by a resilient diaphragm, said diaphragm being responsive to negative pressure within said tubular member to relieve negative pressure within said tubular member at a predetermined threshold, said first tubular member being adapted for anchoring along an exterior surface of said tract in sealing engagement thereto.

2. A relief valve as in claim 1, wherein:

said air tract forms a part of an intake tract of an I.C. engine.

3. A relief valve as in claim 2, wherein:

said walls of said tubular member include multiple apertures surrounding said diaphragm, said diaphragm having an annular shape which is complementary to and underlies said multiple apertures.

4. A relief valve as in claim 3, further comprising:

a supplementary support means for bolstering the resiliency of said resilient diaphragm, said supplementary support means being located within said tubular member and adjacent said resilient diaphragm.

5. A relief valve as in claim 4, wherein:

said supplementary support means is a foam element.

6. A relief valve as in claim 2, further comprising:

a filter means located externally, with respect to said tubular member and said at least one aperture, for filtering air passing through said aperture.

7. A relief valve as in claim 6, wherein:

said filter means has an annular shape and surrounds said tubular member.

8. A relief valve as in claim 2, wherein:

said tubular member has a first end and a second end and each of said first and second ends includes extended collar elements for attaching said relief valve to said exterior surface of said tract.

9. A negative pressure intake tract of a vacuum source for conducting fluid flow there through, said intake tract comprising:

a tubular passageway defining an intake tract having a first and second end and at least one portal in a wall thereof located between said first and second ends, a pressure relief valve structure surrounding an outer surface of said tubular passageway and aligned so as to cover over said portal, said relief valve structure including at least one aperture therein, said aperture being covered, and fluid flow through said aperture being regulated by a resilient diaphragm member responsive to negative pressure within said intake tract wherein when said negative pressure exceeds a predetermined threshold, said resilient diaphragm enables fluid flow through said aperture and portal thereby relieving said negative pressure within said intake tract.

10. A negative pressure intake tract as in claim 9, wherein:

said intake tract forms a part of an intake tract of an I.C. engine.

11. A tract as in claim 10, wherein:

said relief valve structure includes multiple apertures surrounding said diaphragm member, said diaphragm member having an annular shape which is complementary to and underlies said multiple apertures.

12. A tract as in claim 11, further comprising:

a supplementary support means for bolstering the resiliency of said diaphragm element, said supplementary support means being located within said relief valve structure.

13. A tract as in claim 12, wherein:

said supplementary support means is a foam element.

14. A tract as in claim 10, further comprising:

a filter means located externally, with respect to said relief valve structure and said at least one aperture, for filtering air passing through said aperture.

15. A tract as in claim 14, wherein:

said filter means has an annular shape and surrounds said relief valve structure.

16. A pressure relief valve in combination with an intake tract of an internal combustion engine, said combination comprising:

an air induction tube having a first end in communication with an external environment and extending to a second end in communication with a throttle body of said internal combustion engine; and a pressure relief valve connected to said air induction tube disposed between said first and second ends of said air induction tube, wherein when a pressure differential between said external environment and within said air induction tube reaches a predetermined threshold, said pressure relief valve opens establishing a path to said external environment thereby providing a supplemental source of air to said throttle body.

17. The combination according to claim 16, wherein said pressure relief valve is positioned higher than said first end of said air induction tube relative to said throttle body and said internal combustion engine.

18. The combination according to claim 16, wherein said pressure relief valve comprises:

a first tubular member having longitudinally extending walls defining a passageway therein, said longitudinally extending walls including at least one aperture therein and being covered by a resilient diaphragm, said diaphragm being responsive to negative pressure within said tubular member to relieve negative pressure within said tubular member at said predetermined threshold, said first tubular member being adapted for anchoring along an exterior surface of said air induction tract in sealing engagement thereto.

19. The combination according to claim 18, wherein:

said walls of said tubular member include multiple apertures surrounding said diaphragm, said diaphragm having an annular shape which is complementary to and underlies said multiple apertures.

20. The combination according to claim 19, further comprising:

a supplementary support means for bolstering the resiliency of said resilient diaphragm, said supplementary support means being located within said tubular member and adjacent said resilient diaphragm.

* * * * * ns

(12) EX PARTE REEXAMINATION CERTIFICATE (5302nd)
United States Patent
Concialdi

(10) Number: US 6,394,128 C1
(45) Certificate Issued: Mar. 14, 2006

(54) INTAKE TRACT NEGATIVE PRESSURE RELIEF VALVE FOR I.C. ENGINE

(75) Inventor: John P. Concialdi, Redondo Beach, CA (US)

(73) Assignee: Advanced Engine Management, Inc., Hawthorne, CA (US)

Reexamination Request:
No. 90/006,657, Jun. 4, 2003

Reexamination Certificate for:
Patent No.: 6,394,128
Issued: May 28, 2002
Appl. No.: 09/691,159
Filed: Oct. 19, 2000

(51) Int. Cl.
*F16K 31/126* (2006.01)

(52) U.S. Cl. .................. 137/550; 137/526; 137/859; 137/907; 137/479; 123/188.1

(58) Field of Classification Search ............... 137/479, 137/480, 481, 482, 483, 526; 123/198 E
See application file for complete search history.

(56) References Cited

U.S. PATENT DOCUMENTS

| | | | |
|---|---|---|---|
| 2,837,112 A | * | 6/1958 | Foley |
| 3,556,043 A | | 1/1971 | Vayda ..................... 116/70 |
| 3,736,900 A | | 6/1973 | Nowicki ................... 116/70 |
| 3,870,008 A | * | 3/1975 | Wilkerson ................ 114/211 |
| 3,877,908 A | * | 4/1975 | Phelps ..................... 55/419 |
| 4,160,433 A | | 7/1979 | Olson ...................... 123/124 |
| 4,172,438 A | * | 10/1979 | MacGuire ................. 123/585 |
| 4,369,728 A | | 1/1983 | Nelson ..................... 116/276 |
| 4,428,393 A | | 1/1984 | Anderson et al. ......... 137/117 |
| 4,971,004 A | | 11/1990 | Keller ...................... 123/320 |
| 5,090,393 A | | 2/1992 | Holch ...................... 123/574 |
| 5,400,753 A | * | 3/1995 | Andress et al. ......... 123/198 E |
| 6,453,866 B1 | * | 9/2002 | Altmann et al. ....... 123/184.21 |
| 6,564,768 B1 | * | 5/2003 | Bauer et al. ........... 123/198 E |

FOREIGN PATENT DOCUMENTS

| | | |
|---|---|---|
| EP | 798456 | 1/1997 |
| JP | 5302520 | 11/1993 |
| WO | 9902831 | 1/1999 |

\* cited by examiner

*Primary Examiner*—John Fox

(57) ABSTRACT

A pressure relief valve is disclosed for use in air intake tracts of I.C. engine installations. The air valve includes a tubular member having apertures therein covered over by resilient diaphragm elements that, when a negative pressure (vacuum) within the system exceeds a pre-determined level, deflect and enable relief of the negative pressure within the air intake. When the negative pressure returns to normal operating levels, the diaphragm returns to position. The negative pressure within the intake tract can be raised, for example, by an obstruction at the air inlet of the tract.

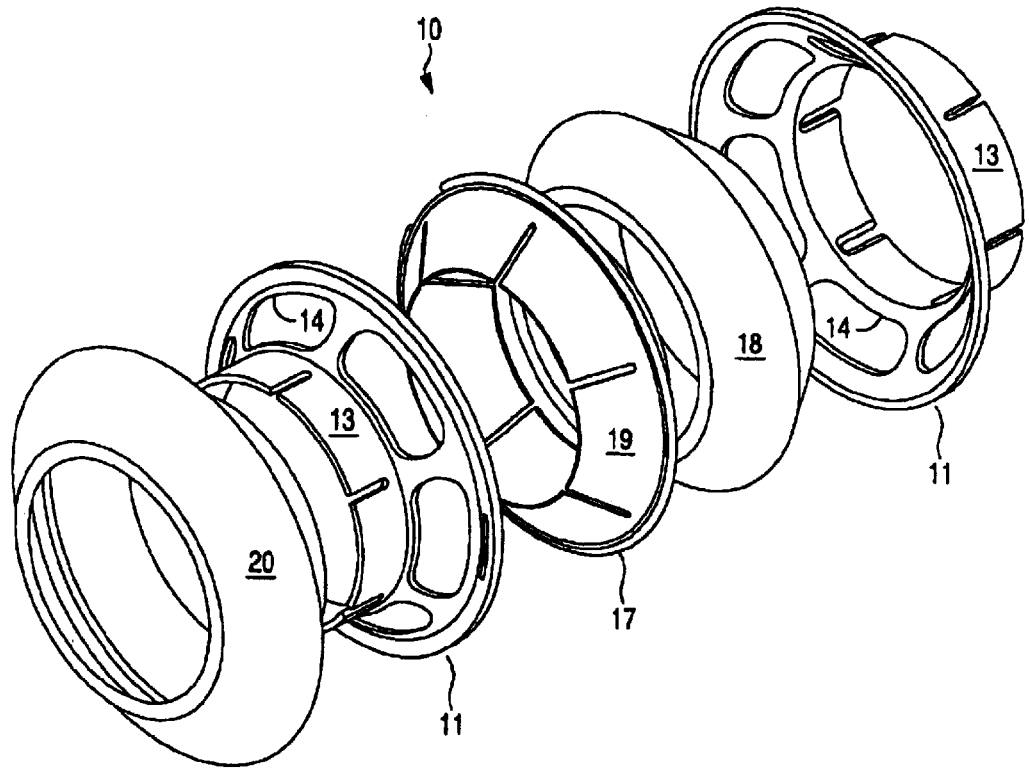

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–15 is confirmed.

Claims 2 and 16–17 are cancelled.

Claims 1, 3, 4, 6, 8, 18 and 20 are determined to be patentable as amended.

Claims 5, 7 and 19, dependent on an amended claim, are determined to be patentable.

New Claims 21–27 are added and determined to be patentable.

1. A relief valve adapted for connecting along a tubular air tract between an air intake connected to said tract and a source of vacuum also connected to said tract, *said air tract forming a part of an intake tract of an internal combustion engine and providing a first normal source of consumable air to facilitate normal operation of said engine*, said relief valve comprising:
   a first tubular member having walls defining a passageway therein, said walls including at least one aperture therein covered by a resilient diaphragm, said diaphragm being responsive to negative pressure within said tubular member to relieve negative pressure within said tubular member at a predetermined threshold *and provide an alternate path to a supplemental source of consumable air sufficient to independently maintain operation of said engine*, said first tubular member being adapted for anchoring along an exterior surface of said tract in sealing engagement thereto.

3. A relief valve as in claim [2] *1*, wherein:
   said walls of said tubular member include multiple apertures surrounding said diaphragm, said diaphragm having an annular shape which is complementary to and underlies said multiple apertures.

4. A relief valve [as in claim 3, further comprising:] *adapted for connecting along a tubular air tract between an air intake connected to said tract and a source of vacuum also connected to said tract, said relief valve comprising:*
   *a first tubular member having walls defining a passageway therein, said walls including at least one aperture therein covered by a resilient diaphragm, said diaphragm being responsive to negative pressure within said tubular member to relieve negative pressure within said tubular member at a predetermined threshold, said first tubular member being adapted for anchoring along an exterior surface of said tract in sealing engagement thereto; wherein said air tract forms a part of an intake tract of an I.C. engine; wherein said walls of said tubular member include multiple apertures* surrounding said diaphragm, said diaphragm having an annular shape which is complementary to and underlies said multiple apertures; and
   a supplementary support means for bolstering the resiliency of said resilient diaphragm, said supplementary support means being located within said tubular member and adjacent said resilient diaphragm.

6. A relief valve as in claim [2] *1*, further comprising:
   a filter means located externally, with respect to said tubular member and said at least one aperture, for filtering air passing through said aperture.

8. A relief valve [as in claim 2, wherein:] *adapted for connecting along a tubular air tract between an air intake connected to said tract and a source of vacuum also connected to said tract, said relief valve comprising:*
   *a first tubular member having walls defining a passageway therein, said walls including at least one aperture therein covered by a resilient diaphragm, said diaphragm being responsive to negative pressure within said tubular member to relieve negative pressure within said tubular member at a predetermined threshold, said first tubular member being adapted for anchoring along an exterior surface of said tract in sealing engagement thereto; said air tract forms a part of an intake tract of an I.C. engine; and*
   said tubular member has a first end and a second end and each of said first and second ends includes extended collar elements for attaching said relief valve to said exterior surface of said tract.

18. [The combination according to claim 16,] *A pressure relief valve in combination with an intake tract of an internal combustion engine,* said combination comprising:
   an air induction tube having a first end in communication with an external environment and extending to a second end in communication with a throttle body of said internal combustion engine; said first end of said air induction tube providing communication with a first source of air to facilitate normal operation of said engine; and
   a pressure relief valve connected to said air induction tube disposed between said first and second ends of said air induction tube, wherein when a pressure differential between said external environment and within said air induction tube reaches a predetermined threshold, said pressure relief valve opens establishing an alternate path to said external environment thereby providing a supplemental source of air to said throttle body; whereby said supplemental source of air flows through said pressure relief valve to said throttle body sufficient to independently provide consumable air to thereby sustain normal operation of said engine independent from said first source of air; wherein said pressure relief valve comprises:
   a first tubular member having longitudinally extending walls defining a passageway therein, said longitudinally extending walls including at least one aperture therein and being covered by a resilient diaphragm, said diaphragm being responsive to negative pressure within said tubular member to relieve negative pressure within said tubular member at said predetermined threshold, said first tubular member being adapted for anchoring along an exterior surface of said air induction tract in sealing engagement thereto.

20. [The combination according to claim 19, further comprising:] *A pressure relief valve in combination with an intake tract of an internal combustion engine, said combination comprising:* an air induction tube having a first end in communication with an external environment and extending to a second end in communication with a throttle body of said internal combustion engine;

a pressure relief valve connected to said air induction tube disposed between said first and second ends of said air induction tube, wherein when a pressure differential between said external environment and within said air induction tube reaches a predetermined threshold, said pressure relief valve opens establishing a path to said external environment thereby providing a supplemental source of air to said throttle body; wherein said pressure relief valve comprises a first tubular member having longitudinally extending walls defining a passageway therein, said longitudinally extending walls including at least one aperture therein and being covered by a resilient diaphragm, said diaphragm being responsive to negative pressure within said tubular member to relieve negative pressure within said tubular member at said predetermined threshold, said first tubular member being adapted for anchoring along an exterior surface of said air induction tract in sealing engagement thereto, and wherein said walls of said tubular member include multiple apertures surrounding said diaphragm, said diaphragm having an annular shape which is complementary to and underlies said multiple apertures; and a supplementary support means for bolstering the resiliency of said resilient diaphragm, said supplementary support means being located within said tubular member and adjacent said resilient diaphragm.

21. A pressure relief valve in combination with an intake tract of an internal combustion engine, said combination comprising:

an air induction tube having a first end in communication with an external environment and extending to a second end in communication with a throttle body of said internal combustion engine; said first end of said air induction tube providing communication with a first source of air thereby establishing a sufficient amount of consumable air through said air induction tube to said throttle body to facilitate normal combustion of said engine; and a pressure relief valve connected to said air induction tube and disposed between said first and second ends of said air induction tube, wherein when an obstruction prevents sufficient consumable air flow through said first end of said air induction end to maintain operation of said engine and a pressure differential between said external environment and within said air induction tube reaches a predetermined threshold, said pressure relief valve opens establishing an alternate air path to said external environment thereby providing a supplemental source of air directly to said throttle body; whereby said supplemental source of air bypasses said first end of said air induction tube to said throttle body and independently provides sufficient amounts of consumable air to thereby sustain continued operation of said engine independent from said first source of air; wherein said air induction tube includes at least one opening provided to permit said sufficient amounts of consumable air to flow there through to sustain continued operation of said engine, said pressure relief valve including a deformable resilient member externally disposed relative to said at least one opening and biased by its own resilience to prevent airflow through said at least opening during normal operation of said engine, wherein when said pressure differential between said external environment and within said air induction tube reaches said predetermined threshold said deformable resilient member deforms to substantially permit said supplemental source of air to flow through said at least one opening thereby facilitating said continued operation of said engine.

22. A pressure relief valve in combination with an intake tract of an internal combustion engine, said combination comprising:

an air induction tube having a first end in communication with an external environment and extending to a second end in communication with a throttle body of said internal combustion engine; said first end of said air induction tube providing communication with a first source of air thereby establishing a sufficient amount of consumable air through said air induction tube to said throttle body to facilitate normal combustion of said engine; and a pressure relief valve connected to said air induction tube and disposed between said first and second ends of said air induction tube, wherein when an obstruction prevents sufficient consumable air flow through said first end of said air induction end to maintain operation of said engine and a pressure differential between said external environment and within said air induction tube reaches a predetermined threshold, said pressure relief valve opens establishing an alternate air path to said external environment thereby providing a supplemental source of air directly to said throttle body; whereby said supplemental source of air bypasses said first end of said air induction tube to said throttle body and independently provides sufficient amounts of consumable air to thereby sustain continued operation of said engine independent from said first source of air; wherein said induction tube has a substantially circular cross section and said pressure relief valve is formed as a modular assembly slid over said induction tube and aligned with said at least one opening of said induction tube, said combination including a pair of clamps positioned to clamp and seal said pressure relief valve to said induction tube.

23. The combination according to claim 21, wherein said induction tube has a substantially circular cross section and said pressure relief valve is formed as a modular assembly slid over said induction tube and aligned with said at least one opening of said induction tube, said combination including a pair of clamps positioned to clamp and seal said pressure relief valve to said induction tube.

24. The combination according to claim 21, wherein said pressure relief valve further includes a modular body, said modular body further including a pair of tubular elements joined together and substantially surrounding said resilient member, said modular body having an internal surface substantially corresponding to an external surface of said induction tube and being connected thereto.

25. The relief valve according to claim 1, wherein said pressure relief valve is formed as a modular assembly having a substantially circular cross section, said modular assembly including a pair of clamps disposed on opposite sides of said assembly to facilitate forming a sealed clamped connection to said tubular air tract.

26. The relief valve according to claim 25, said modular assembly including a deformable resilient member and being biased by its own resilience in a closed position to prevent airflow through said relief valve during normal operation of said engine, wherein when said a pressure differential between said external environment and within said tubular member reaches said predetermined threshold said deformable resilient member deforms to substantially permit said supplemental source of air to flow through relief valve thereby facilitating said continued operation of said engine.

27. The relief valve according to claim 1, wherein said pressur relief valve opens and thereby provides sufficient consumable air to sustain operation of said engine when said air intake portion of said tubular air tract fouled is submerged in water.

\* \* \* \* \*